US011454184B2

(12) United States Patent
Fujimoto et al.

(10) Patent No.: US 11,454,184 B2
(45) Date of Patent: Sep. 27, 2022

(54) CONTROL DEVICE FOR AN INTERNAL COMBUSTION ENGINE

(71) Applicant: Mitsubishi Electric Corporation, Tokyo (JP)

(72) Inventors: Tatsuo Fujimoto, Tokyo (JP); Nobuyoshi Tomomatsu, Tokyo (JP); Takuma Kusagaki, Tokyo (JP); Kenichi Yamagata, Tokyo (JP); Kenichiro Yonezawa, Tokyo (JP); Siyu Liu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 16/829,330

(22) Filed: Mar. 25, 2020

(65) Prior Publication Data

US 2020/0340415 A1 Oct. 29, 2020

(30) Foreign Application Priority Data

Apr. 23, 2019 (JP) .............................. JP2019-081467

(51) Int. Cl.
*F02D 41/14* (2006.01)
*F02D 41/00* (2006.01)
(Continued)

(52) U.S. Cl.
CPC ....... *F02D 41/1497* (2013.01); *F02D 41/009* (2013.01); *G01M 15/06* (2013.01); *G01M 15/11* (2013.01); *F02D 2200/1015* (2013.01)

(58) Field of Classification Search
CPC .............. F02D 41/1497; F02D 41/009; F02D 2200/1015; G01M 15/06; G01M 15/11
(Continued)

(56) References Cited

U.S. PATENT DOCUMENTS 5,263,453 A * 11/1993 Wakahara .............. G01M 15/11
123/436
5,301,546 A * 4/1994 Inada ...................... F02P 17/12
73/114.04
(Continued)

FOREIGN PATENT DOCUMENTS

EP 0 795 686 A2 9/1997
JP 05-332194 A 12/1993
(Continued)

OTHER PUBLICATIONS

Japanese Office Action for corresponds to JP 2019-081467, dated Dec. 24, 2019.
(Continued)

*Primary Examiner* — Logan M Kraft
*Assistant Examiner* — John D Bailey
(74) *Attorney, Agent, or Firm* — Sughrue Mion, PLLC; Richard C. Turner

(57) ABSTRACT

The control device for an internal combustion engine disclosed in the present application is a control device that determines the presence or absence of misfire based on an angle detection cycle calculated from an output signal of an angle sensor, the control device includes an arithmetic processing device and a storage device, the control device is configured so that the storage device stores the angle detection cycle calculated in a misfire detection threshold value comparison section after the reference angle section as a threshold value comparison target cycle and is configured such that the arithmetic processing device determines the presence or absence of misfire based on the misfire detection threshold value cycle calculated based on the reference detection cycle and the threshold value comparison target cycle, thereby it becomes possible to accurately determine
(Continued)

the presence or absence of misfire in the control device for the internal combustion engine.

8 Claims, 6 Drawing Sheets

(51) Int. Cl.
  *G01M 15/11* (2006.01)
  *G01M 15/06* (2006.01)
(58) Field of Classification Search
  USPC .................................................. 73/114.02
  See application file for complete search history.

(56) References Cited

U.S. PATENT DOCUMENTS

| | | | |
|---|---|---|---|
| 5,337,240 A * | 8/1994 | Nakagawa | G01M 15/11 |
| | | | 701/99 |
| 5,381,689 A | 1/1995 | Ishida | |
| 6,732,713 B1 * | 5/2004 | Kanazawa | F02D 41/062 |
| | | | 123/406.6 |
| 7,136,739 B2 * | 11/2006 | Miyata | G01M 15/11 |
| | | | 73/114.04 |
| 2006/0142926 A1 * | 6/2006 | Yasui | F02D 41/1497 |
| | | | 701/111 |
| 2007/0157713 A1 * | 7/2007 | Tsukamoto | G01M 15/11 |
| | | | 73/114.04 |
| 2008/0103681 A1 * | 5/2008 | Shikama | G01M 15/11 |
| | | | 701/111 |
| 2008/0245142 A1 * | 10/2008 | Bowling | G01M 15/06 |
| | | | 73/114.26 |
| 2009/0118990 A1 * | 5/2009 | Suzuki | F02D 29/02 |
| | | | 701/111 |
| 2009/0158829 A1 * | 6/2009 | Suzuki | F02D 41/0097 |
| | | | 73/114.25 |
| 2010/0030455 A1 * | 2/2010 | Akimoto | B60L 50/61 |
| | | | 701/111 |
| 2010/0031736 A1 * | 2/2010 | Kushihama | G01M 15/11 |
| | | | 73/114.04 |
| 2012/0239311 A1 * | 9/2012 | Hozumi | G01M 15/11 |
| | | | 702/35 |
| 2017/0167950 A1 * | 6/2017 | Soneda | F02D 41/2416 |
| 2017/0299468 A1 * | 10/2017 | Jino | F02D 41/0097 |
| 2019/0128199 A1 * | 5/2019 | Hotta | F02P 17/12 |
| 2019/0383704 A1 * | 12/2019 | Fujimoto | G01M 15/11 |
| 2020/0309053 A1 * | 10/2020 | Anzawa | F02D 41/068 |

FOREIGN PATENT DOCUMENTS

| | | |
|---|---|---|
| JP | 09-303194 A | 11/1997 |
| JP | 2008-111353 A | 5/2008 |
| JP | 4509986 B2 | 7/2010 |
| JP | 4633809 B2 | 2/2011 |
| JP | 2016-084736 A | 5/2016 |

OTHER PUBLICATIONS

Japanese Office Action for corresponding JP 2019-081467, dated Mar. 3, 2020.

* cited by examiner

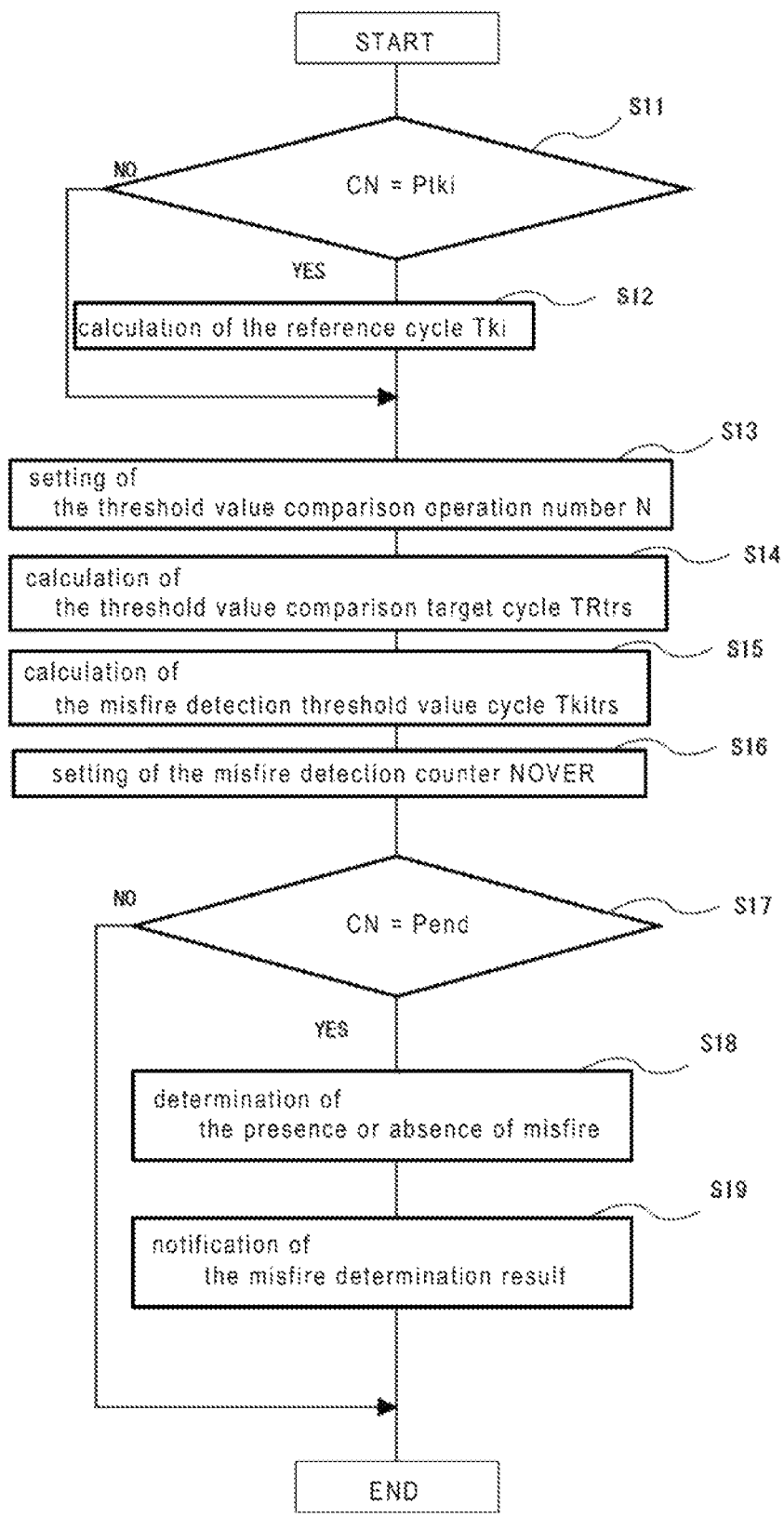

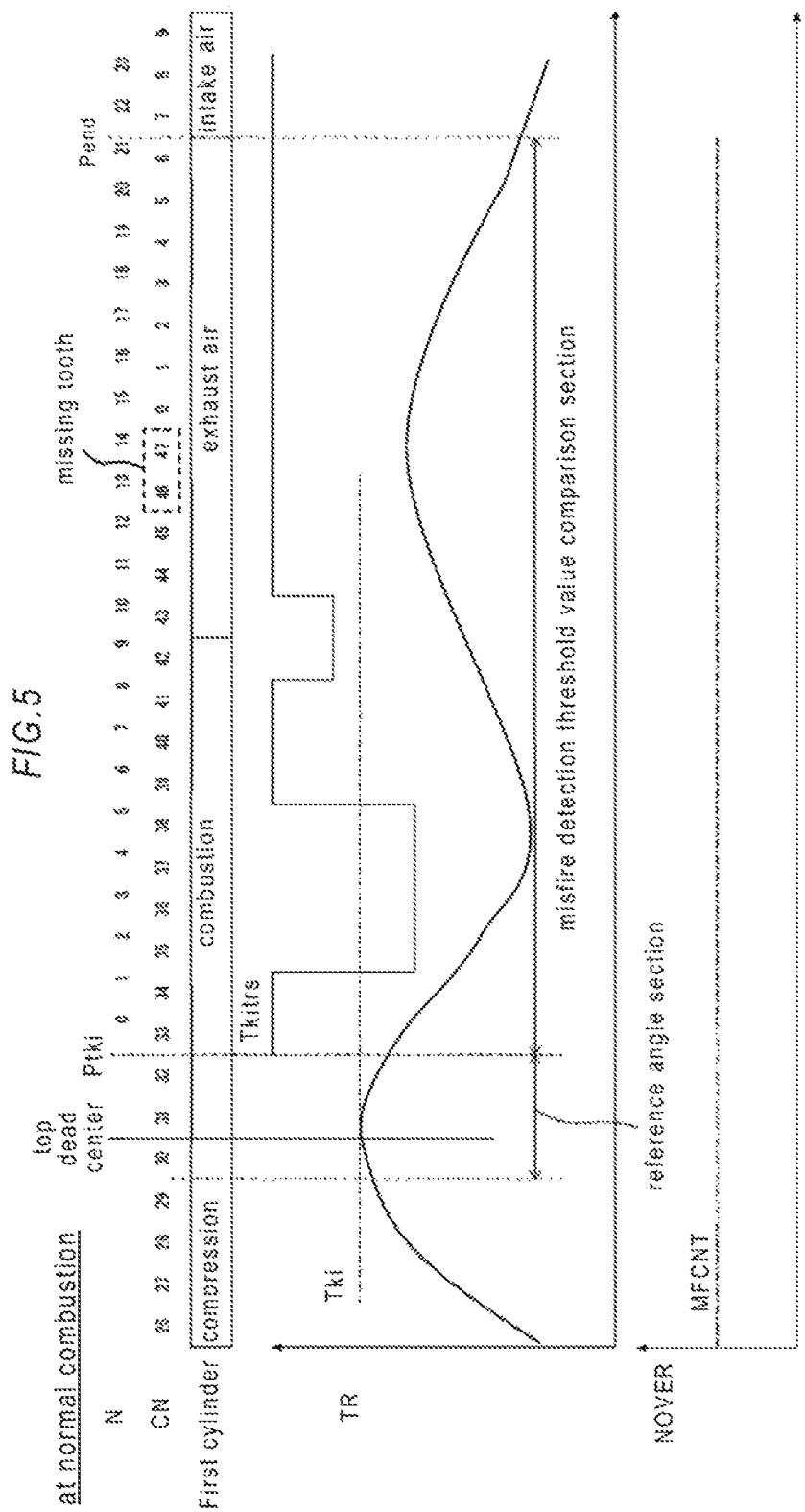

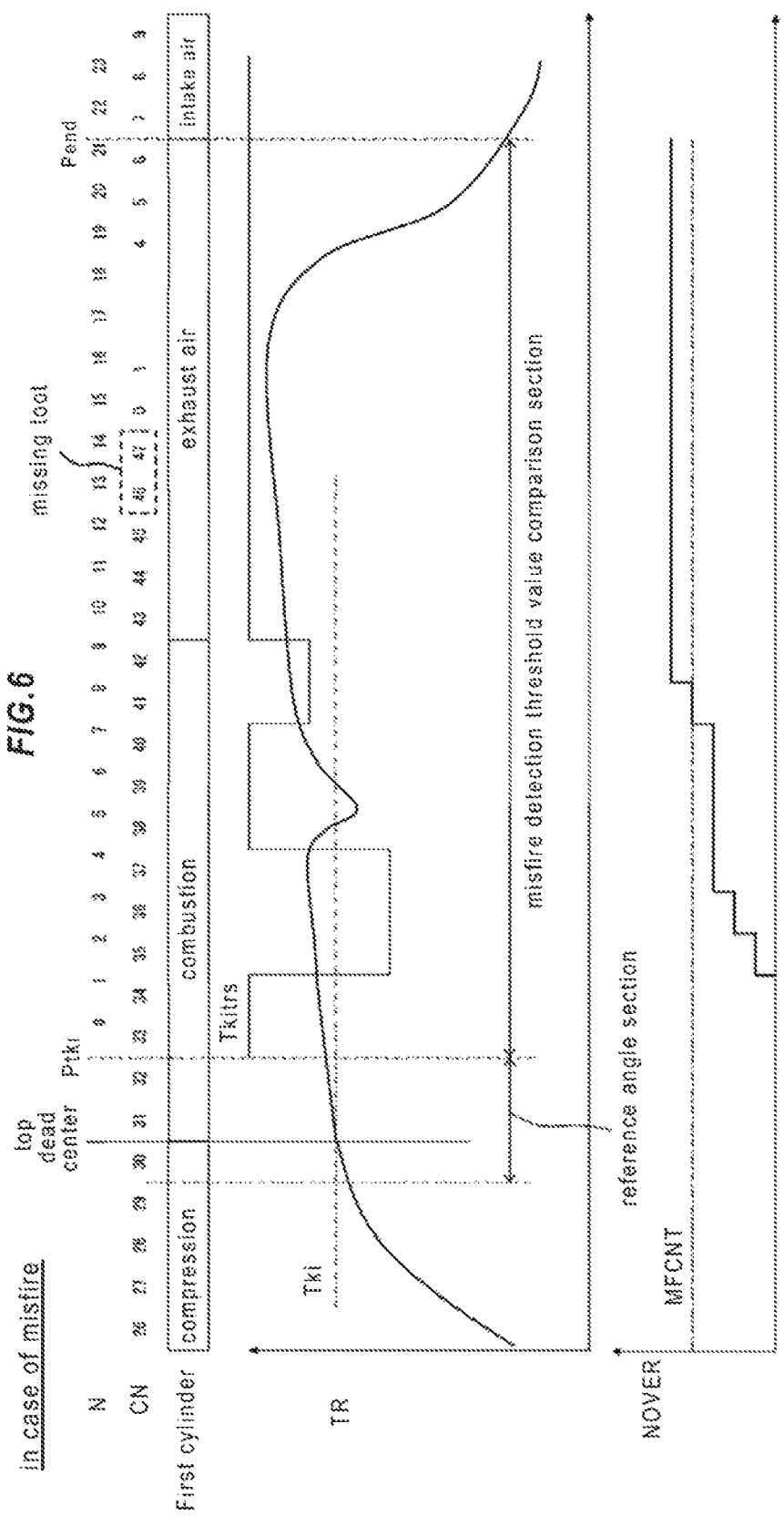

CONTROL DEVICE FOR AN INTERNAL COMBUSTION ENGINE

TECHNICAL FIELD

The present application relates to a control device for an internal combustion engine that determines the presence or absence of misfire.

BACKGROUND ART

As a control device for an internal combustion engine that determines the presence or absence of misfire, the technology disclosed in Patent Document 1 below is known.

In the technology of Patent Document 1, the detection cycle of the crankshaft angle detected by the crank angle sensor is measured, and the rotational speed of the internal combustion engine is calculated from the angle detection cycle. Then, the detected value of the rotational speed near the top dead center of the compression stroke of the cylinder for determining misfire is set as the reference rotational speed, the deviation between the reference rotational speed and the rotational speed detected at each crankshaft angle in the combustion stroke after the top dead center is accumulated, the presence or absence of misfire may be determined based on the accumulated value.

PRIOR ART DOCUMENT

Patent Literature

[Patent Literature 1] JP 4509986 B2

DISCLOSURE OF INVENTION

Technical Problem

The occurrence of misfire causes rotational fluctuation, particularly in the combustion stroke. However, the rotational fluctuation of the internal combustion engine is also caused by factors other than misfire (for example, the acceleration and deceleration of the vehicle, the amount of intake air filled in the combustion chamber, etc.).

For example, if the vehicle is accelerating or decelerating, the angle detection cycle decreases or increases as a whole. Further, as the combustion torque increases as the intake air amount increases, the fluctuation amount of the angle detection cycle in the combustion stroke also increases. In particular, when the inertia of the vehicle and the power transmission system is small, such as in a two-wheel vehicle, the amount of decrease or increase in the angle detection cycle due to factors other than misfire increases.

As described above, the influence of rotational fluctuation due to factors other than misfire also appears in the angle detection cycle of the combustion stroke. Therefore, as in the technology of Patent Document 1, based on the integrated value of the deviation between the reference rotational speed and the rotational speed detected at each crankshaft angle in the combustion stroke after the top dead center, when the presence or absence of misfire is determined, if the angle detection cycle of the combustion stroke fluctuates due to factors other than misfire, the rotational speed deviation based on the fluctuating angle detection cycle is included in the integrated value. This can reduce the accuracy of misfire detection.

Therefore, a control device for an internal combustion engine that can accurately determine the presence or absence of misfire even when rotational fluctuation of the internal combustion engine occurs due to factors other than misfire can be preferable.

This application discloses the technology made in view of the above situation, and it is an object of the present invention to make it possible to accurately determine the presence or absence of misfire in a control device for an internal combustion engine.

Solution to Problem

A control device for an internal combustion engine disclosed in the present application is a control device for an internal combustion engine wherein presence or absence of misfire based on the angle detection cycle calculated from an output signal of an angle sensor is determined, and wherein, the control device includes an arithmetic processing device, a storage device, and an input circuit, in the control device, the arithmetic processing device calculates the angle detection cycle from the output signal of the angle sensor input from the input circuit, the storage device is configured to store the angle detection cycle calculated within a reference angle interval including a top dead center of the compression stroke of the internal combustion engine as a reference detection cycle, the control device is configured so that the storage device stores the angle detection cycle calculated in a misfire detection threshold value comparison section after the reference angle section as a threshold value comparison target cycle, the control device is configured such that the arithmetic processing device determines the presence or the absence of misfire based on the misfire detection threshold value cycle calculated based on the reference detection cycle and the threshold value comparison target cycle.

Advantageous Effects of Invention

The control device for an internal combustion engine disclosed in the present application is a control device for an internal combustion engine wherein presence or absence of misfire based on the angle detection cycle calculated from an output signal of an angle sensor is determined, and wherein, the control device includes an arithmetic processing device, a storage device, and an input circuit, in the control device, the arithmetic processing device calculates the angle detection cycle from the output signal of the angle sensor input from the input circuit, the storage device is configured to store the angle detection cycle calculated within a reference angle interval including a top dead center of the compression stroke of the internal combustion engine as a reference detection cycle, the control device is configured so that the storage device stores the angle detection cycle calculated in a misfire detection threshold value comparison section after the reference angle section as a threshold value comparison target cycle, the control device is configured such that the arithmetic processing device determines the presence or the absence of misfire based on the misfire detection threshold value cycle calculated based on the reference detection cycle and the threshold value comparison target cycle, it becomes possible to accurately determine the presence or absence of misfire in the control device for the internal combustion engine.

BRIEF DESCRIPTION OF DRAWINGS

FIG. 4 is a diagram illustrating the first embodiment of the present application, and is a flowchart for explaining an example of processing of a control device.

FIG. 5 is a diagram showing the first embodiment of the present application, and is a time chart for explaining the control behavior when no misfire has occurred (during normal combustion), and illustrating the change of the angle detection cycle TR for each detection of the crankshaft angle.

FIG. 6 is a diagram illustrating the first embodiment of the present application, and is a time chart for explaining the control behavior when misfire occurs, and illustrates the change in the angle detection cycle TR for each detection of the crankshaft angle.

DESCRIPTION OF EMBODIMENTS

Figure 1:
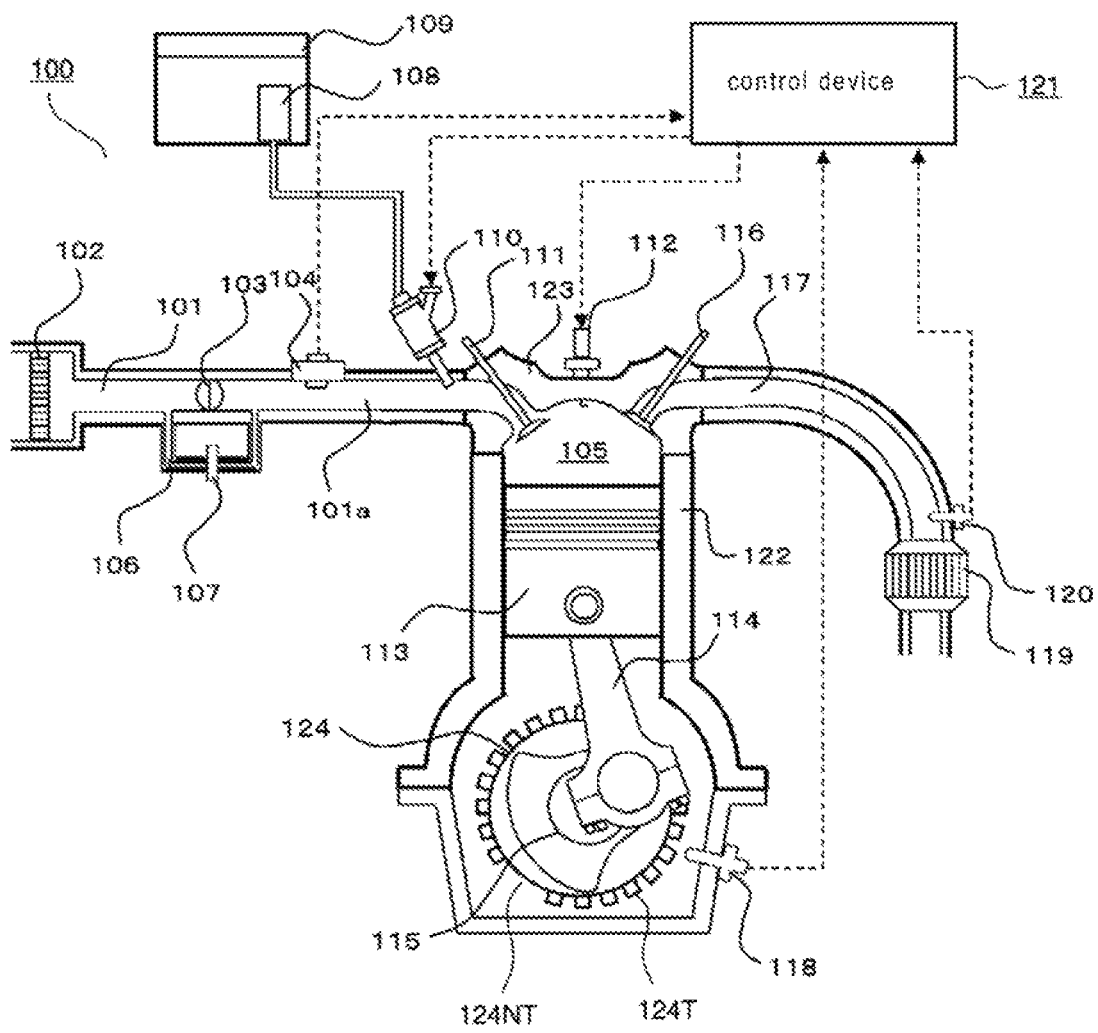
FIG. 1 is a diagram illustrating the first embodiment of the present application and is a schematic configuration diagram illustrating an example of an internal combustion engine and a control device.
Figure 2:
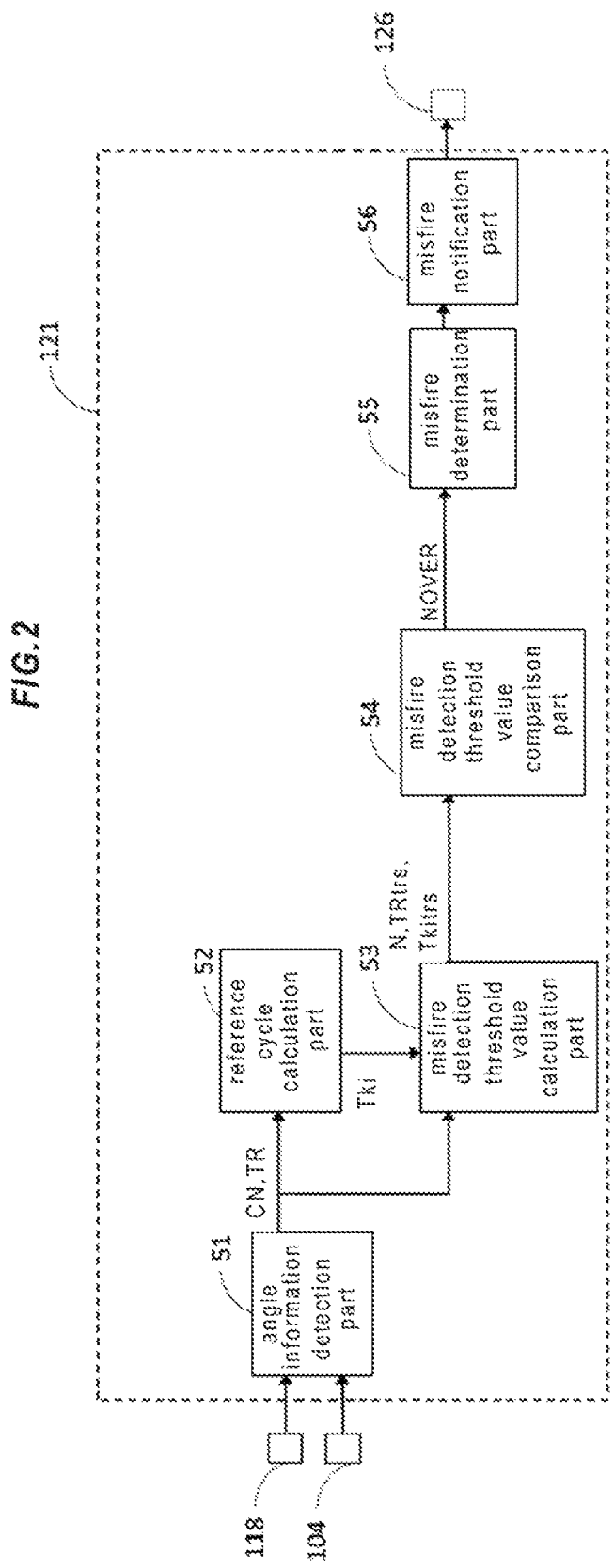
FIG. 2 is a diagram illustrating the first embodiment of the present application and a block diagram illustrating an example of a functional configuration of a control device.

Hereinafter, an embodiment of a control device for an internal combustion engine according to the present application will be described with reference to the drawings. Note that the present application is not limited to the following description, and that it can change suitably to the range which does not deviate from the subject matter of the present application. In the following drawings, for easy understanding, the scales of the respective members may be different from the actual scales, and illustration of configurations not related to the features of the present application is omitted. In the drawings, the same reference numerals indicate the same or corresponding parts.

First Embodiment

A control device 121 for an internal combustion engine (hereinafter simply referred to as control device 121) and a control method for the internal combustion engine according to the first embodiment will be described with reference to FIG. 1, and the configuration and the function of the control device of the first embodiment will be described with reference to FIGS. 2 to 6. The present embodiment is exemplified for the case where the internal combustion engine 100 and the control device 121 are mounted on a two-wheel vehicle, and the internal combustion engine 100 serves as a driving force source for wheels.

Hereinafter, with respect to the embodiments of the present application, details will be described in the following order "1-1. Description of the configuration and the function of the internal combustion engine of the first embodiment", "1-2. Description of the configuration and the function of the control device of the first embodiment", "Detailed description of an <Angle information detection part 51>", "Detailed description of the <Misfire detection process>", "Detailed description of a <Reference cycle calculation part 52>", "Detailed description of a <Misfire detection threshold value calculation part 53>", "Detailed description of a <Misfire detection threshold value comparison part 54>", "Detailed description of a <Misfire determination part 55>", "Detailed description of a <Misfire notification part 56>", and "Description of the [Other Embodiments]".

1-1. Description of the Configuration and the Function of the Internal Combustion Engine of the First Embodiment The internal combustion engine 100 is a four-cycle engine that performs four cycles of an intake stroke, a compression stroke, a combustion stroke, and an exhaust stroke as 1 combustion cycle. The internal combustion engine 100 is a gasoline internal combustion engine. The internal combustion engine 100 has a combustion chamber 105 that burns an air-fuel mixture. The combustion chamber 105 is also referred to as a cylinder. The combustion chamber 105 is constituted by a cylinder and a piston 113. The cylinder includes a cylinder block 122 that forms the wall surface of the cylinder, and a cylinder head 123 that forms the top of the cylinder. In the present embodiment, the internal combustion engine 100 is a V-type two-cylinder engine. Note that FIG. 1 shows the first cylinder as a representative, the first cylinder will be described below as a representative.

The internal combustion engine 100 includes an intake passage 101 that supplies air to the combustion chamber 105 and an exhaust passage 117 that discharges exhaust gas burned in the combustion chamber 105. In the intake passage 101, an air filter 102, a throttle valve 103, and an intake pressure sensor 104 are provided from the upstream side. The intake pressure sensor 104 outputs a signal corresponding to the pressure of the gas in an intake pipe 101a that is the intake passage 101 downstream of the throttle valve 103. An output signal of the intake pressure sensor 104 is input to the control device 121. The intake passage 101 provides a bypass passage 106 that bypasses the throttle valve 103 and communicates the upstream side and the downstream side of the throttle valve 103, and an idle speed control valve 107 that adjusts the opening degree of the bypass passage 106.

An injector 110 that injects fuel to the vicinity of the intake port is provided downstream of the intake pressure sensor 104 in the intake pipe 101a. The fuel pumped up by the fuel pump 108 from the fuel tank 109 is supplied to the injector 110. The injector 110 is driven by a signal output from the control device 121.

A spark plug 112 for igniting the air-fuel mixture is provided at the top of the combustion chamber 105. The electrode of the spark plug 112 is exposed in the combustion chamber 105. The spark plug 112 is supplied with ignition energy from the control device 121 via an ignition coil. Further, the top of the combustion chamber 105 (cylinder head 123) provides an intake valve 111 for adjusting the amount of intake air taken into the combustion chamber 105 from the intake passage 101, and an exhaust valve 116 for adjusting the amount of exhaust gas discharged from the combustion chamber 105 into the exhaust passage 117.

The piston 113 is connected to a crankshaft 115 via a connecting rod 114. As the crankshaft 115 rotates, the piston 113 reciprocates up and down in the cylinder.

A three-way catalyst 119 is provided on the downstream side of the exhaust passage 117. Further, the upstream of the three-way catalyst 119 in the exhaust passage 117 provides an O2 sensor 120 that outputs a signal corresponding to the oxygen concentration of the exhaust gas. An output signal of the O2 sensor 120 is input to the control device 121.

The throttle valve 103 is a valve that opens and closes the intake passage 101. By changing the opening of the throttle valve 103, the amount of air supplied to the combustion chamber 105 via the intake pipe 101a is adjusted. The opening degree of the throttle valve 103 changes according to the amount of operation of an accelerator (not shown) by the driver. The idle speed control valve 107 adjusts the flow rate of air flowing through the bypass passage 106 in order to control the rotational speed of the internal combustion engine 100 during idling operation of the internal combustion engine 100.

The injector 110 injects fuel into the air flowing through the intake pipe 101a before the intake valve 111 to form an air-fuel mixture. The intake valve 111 supplies the formed air-fuel mixture to the combustion chamber 105. The spark plug 112 provided in the combustion chamber 105 ignites the air-fuel mixture supplied to the combustion chamber 105 by a discharge spark and burns the air-fuel mixture. Work is done outside by the combustion of the air-fuel mixture. Specifically, the crankshaft 115 rotates via the piston 113 and the connecting rod 114, and rotational energy is extracted from the combustion of the air-fuel mixture. Further the exhaust valve 116 discharges the exhaust gas generated by the combustion of the air-fuel mixture to the exhaust passage 117 by an opening operation.

The internal combustion engine 100 includes a signal plate 124 that rotates integrally with the crankshaft 115. The signal plate 124 is provided with a plurality of teeth 124T at a plurality of predetermined crankshaft angles. In the present embodiment, the signal plate 124 has a tooth 124T arranged at intervals of 15 degrees. The tooth 124T of the signal plate 124 is provided with a missing tooth part 124NT lacking two continuous teeth. Therefore, the signal plate 124 includes 22 teeth 124T. The internal combustion engine 100 is fixed to the cylinder block 122 and includes a crank angle sensor 118 at a position facing the tooth 124T of the signal plate 124.

The crank angle sensor 118 outputs a rectangular crank signal when the tooth 124T of the signal plate 124 cross the crank angle sensor 118.

The signal plate 124 corresponds to the "rotating member" in the present application, the tooth 124T provided on the signal plate 124 correspond to the "detected part" in the present application, the cylinder block 122 corresponds to the "non-rotating member" in the present application, the crank angle sensor 118 corresponds to the "angle sensor" in the present application.

The output signal of the crank angle sensor 118 is input to the control device 121. If the crankshaft 115 rotates 360 degrees at the maximum, the control device 121 can determine the crankshaft angle based on the top dead center and the bottom dead center of the piston 113.

In the case of a four-cycle engine, by combining the information from the intake pressure sensor 104 and the crankshaft angle based on the top dead center and the bottom dead center, the control device 121 can discriminate the four strokes (intake stroke, compression stroke, combustion stroke, exhaust stroke) of the internal combustion engine 100 and can recognize the crankshaft angle based on the top dead center and the bottom dead center. As a result, according to the position of the piston 113, by issuing a fuel injection command from the control device 121 to the injector 110, the control device 121 controls the internal combustion engine 100 such as the fuel injection amount and the air-fuel ratio.

Figure 3:
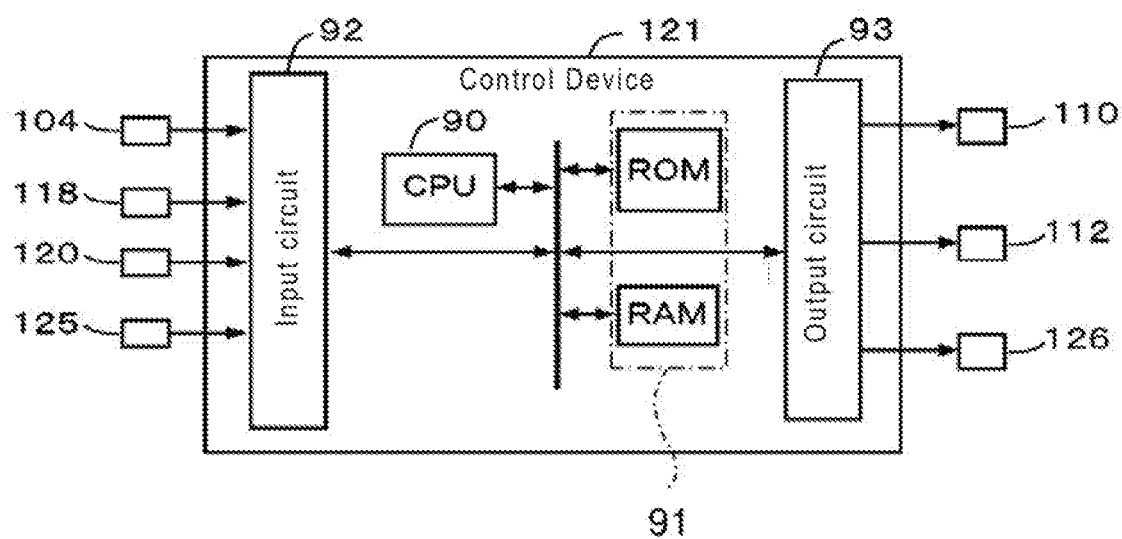
FIG. 3 is a diagram illustrating the first embodiment of the present application, and is a hardware configuration diagram illustrating an example of hardware of a control device.

1-2. Description of the Configuration and the Function of the Control Device of the First Embodiment The control device 121 is a control device that controls the internal combustion engine 100. As in FIG. 2, the control device 121 provides various control parts, as an angle information detection part 51, a reference cycle calculation part 52, a misfire detection threshold value calculation part 53, a misfire detection threshold value comparison part 54, a misfire determination part 55, and a misfire notification part 56. The functions of the angle information detection part 51, the reference cycle calculation part 52, the misfire detection threshold value calculation part 53, the misfire detection threshold value comparison part 54, the misfire determination part 55, and the misfire notification part 56, which are these various control part, are realized by the processing the circuit included in the control device 121. Specifically, as illustrated in FIG. 3, the control device 121, as a processing circuit, includes an arithmetic processing device 90 (computer) such as a CPU (Central Processing Unit), and a storage device 91 that exchanges data with the arithmetic processing device 90, an input circuit 92 for inputting an external signal to the arithmetic processing device 90, and an output circuit 93 for outputting a signal from the arithmetic processing device 90 to the outside.

As the storage device 91, a volatile storage device such as a RAM (Random Access Memory) and a nonvolatile storage device such as a ROM (Read Only Memory) are provided.

The input circuit 92 includes various sensors and switches to be described later, and includes an A/D converter (not shown) that inputs output signals of these sensors and switches to the arithmetic processing device 90.

The output circuit 93 includes a drive circuit (not shown) that is connected to electric loads described later and that output control signals from the arithmetic processing device 90 to these electric loads.

Then, in each function of the angle information detection part 51, the reference cycle calculation part 52, the misfire detection threshold value calculation part 53, the misfire detection threshold value comparison part 54, the misfire determination part 55, and the misfire notification part 56 are realized, when the arithmetic processing device 90 executes software (program) stored in a storage device 91 such as a ROM, by cooperating with other hardware of the control device 121 such as the storage device 91, the input circuit 92, and the output circuit 93.

Note that the setting data such as judgment values used by the angle information detection part 51, the reference cycle calculation part 52, the misfire detection threshold value calculation part 53, the misfire detection threshold value comparison part 54, the misfire determination part 55, and the misfire notification part 56 are stored in a storage device 91 such as a ROM as part of the software (program).

In the present embodiment, the input circuit 92 is connected to the intake pressure sensor 104, a crank angle sensor 118, the O2 sensor 120, and an outside air temperature sensor 125.

The output circuit 93 is connected to the injector 110, the spark plug 112, and an alarm device 126.

In the control device 121, various operating states of the internal combustion engine 100 are detected based on output signals of various sensors such as the intake pressure sensor 104, the crank angle sensor 118, the O2 sensor 120, and the outside air temperature sensor 125. As a basic control, the control device 121 calculates a fuel injection amount based on the detected operation states, and drives and controls the injector 110 and the spark plug 112.

Detailed Description of the <Angle Information Detection Part 51>

The angle information detection part 51 detects the crankshaft angle based on the output signal of the crank angle sensor 118, and every time the crankshaft angle is detected, a crankshaft angle detection cycle TR (hereinafter referred to as the angle detection cycle TR) is detected. In the present embodiment, the angle information detection part 51 determines the crankshaft angle when the falling edge (or rising edge) of the output signal (rectangular wave) of the crank angle sensor 118 is detected. Further, when the angle information detection part 51 detects a falling edge, the angle information detection part 51 measures a time interval from the detection time of the previous falling edge to the detection time of the current falling edge, and calculates the angle detection cycle TR.

In the present embodiment, since the angle detection cycle TR becomes longer at the position of the missing tooth 124NT, the control device 121 detects the position of the missing tooth 124NT based on the angle detection cycle TR. Then, the control device 121 determines the crankshaft angle on the basis of the top dead center and the bottom dead center of the piston 113 on the basis of the crankshaft angle corresponding to the position of the missing tooth 124NT. Further, in the control device 121, based on the crankshaft angle and the actions of the intake pressure detected based on the output signal of the intake pressure sensor 104, the correspondence relationship between the crankshaft angle and the four strokes (intake stroke, compression stroke, combustion stroke, exhaust stroke) is determined.

The crankshaft rotates twice in one combustion cycle, and 48 teeth 124T (including four missing teeth 124NT) pass through the position of the crank angle sensor 118. As shown in FIG. 5, the control device 121 assigns a crank number CN every time a falling edge of the crank angle sensor 118 is detected. In the present embodiment, the control device 121 assigns numerical values from 0 to 22, and 24 to 45 to the crank number CN. The crank number CN at the position of the missing tooth 124NT is 22, 23, 46, 47. In FIG. 5 and FIG. 6 to be described later, the crank numbers CN are illustrated from 0 to 9 and 26 to 47.

In the present embodiment, CN=31 corresponds to 10 degrees after the top dead center of the compression stroke of the first cylinder, CN=7-18 corresponds to the intake stroke of the first cylinder, CN=19-30 corresponds to the compression stroke of the first cylinder, CN=31-42 corresponds to the combustion stroke of the first cylinder, and CN=43-6 corresponds to the exhaust stroke of the first cylinder.

Since it is a V-type two-cylinder engine, CN=0 corresponds to 10 degrees after the top dead center of the compression stroke of the second cylinder, based on this, the crank number CN and each stroke correspond to each other as in the first cylinder.

The angle information detection part 51 uses a timer function provided in the arithmetic processing device 90, as shown in the following equation, by subtracting the time T (CN−1) at which the previous crank number (CN−1) was detected from the time T (CN) at which the current crank number (CN) was detected, the angle detection cycle TR (CN) corresponding to the current crank number (CN) is calculated. The angle detection cycle TR (CN) of each crank number CN is stored in the storage device 91 such as a RAM in association with the crank number CN.

$$TR(CN)=T(CN)-T(CN-1) \quad (1)$$

Since the angle detection cycles TR (0), TR (24) calculated by CN=0,24 after the two missing teeth 124NT are cycles corresponding to a crankshaft angle interval of 45 degrees, it becomes three times the other angle detection cycle.

Detailed Description of the <Misfire Detection Process>

Next, the misfire detection process will be described with reference to the flowchart shown in FIG. 4. The process shown in FIG. 4 is repeatedly executed every time the crank number CN (falling edge) is detected. Although the misfire detection process is performed for each cylinder, the first cylinder will be described below as a representative.

First, in step S11, the reference cycle calculation part 52 determines whether or not the current crank number CN is a reference cycle calculation time point Ptki of the preset first cylinder. In this example, the reference cycle calculation time point Ptki of the first cylinder is set to CN=32 (25 degrees after the top dead center of the compression stroke), which is the end time point of a reference angle section described later. When the reference cycle calculation part 52 is determined as the reference cycle calculation time point Ptki of the first cylinder (step S11: Yes), it progresses to step S12, and when the reference cycle calculation part 52 is not determined as the reference cycle calculation time point Ptki of the first cylinder (step S11: No), it progresses to step S13.

Detailed Description of the <Reference Cycle Calculation Part 52>

In step S12, in the reference cycle calculation part 52, based on the detected value of the crankshaft angle (in this example, the crank number CN) and the angle detection cycle TR, the angle detection cycle TR detected in the reference angle interval that is the crankshaft angle interval which is preset including the top dead center of the compression stroke of the first cylinder is calculated as the reference detection cycle Tki. The reference cycle calculation part 52 stores the reference detection cycle Tki in a storage device 91 such as a RAM.

The top dead center of the compression stroke is the top dead center of the piston between the compression stroke and the combustion stroke, and can also be expressed as the top dead center of the combustion stroke. In the present application, each stroke of the intake stroke, the compression stroke, the combustion stroke, and the exhaust stroke corresponds to a cycle between the top dead center and the bottom dead center of the piston.

In the present embodiment, the reference cycle calculation part 52 is configured to calculate an average value of a plurality of angle detection cycles TR detected within the reference angle section as the reference detection cycle Tki. According to this configuration, it is possible to reduce the influence of fluctuations in the angle detection cycle TR due to manufacturing variations of the signal plate 124.

The reference angle section is set to a section of crank numbers CN=29 to 32, that is, a section from 20 degrees before the top dead center of the compression stroke of the first cylinder to 25 degrees after the top dead center of the compression stroke of the first cylinder. As shown in the following equation, by the reference cycle calculation part 52, the average value of the angle detection cycle TR (30) detected at CN=30, the angle detection cycle TR (31) detected at CN=31, as well as the angle detection cycle TR (32) detected at CN=32 is calculated as a reference detection cycle Tki. The reference detection cycle Tki is stored in a storage device 91 such as a RAM.

$$Tki=\{TR(30)+TR(31)+TR(32)\}/3 \quad (2)$$

Detailed Description of the <Misfire Detection Threshold Value Calculation Part 53>

Next, in step S13, the misfire detection threshold value calculation part 53 assigns a threshold value comparison operation number N to calculate a misfire detection threshold value comparison section. As the threshold value comparison calculation number N, the crank number next to the reference cycle calculation time point Ptki is set to the threshold value comparison calculation start point N=0, and 1 is added to N every time the crank number CN is detected. However, when CN=0 and 24 after the two missing teeth 124NT, 3 is added to N. In this example, N=0 is set to CN=33 (40 degrees after the top dead center of the compression stroke), and a section from N=0 to N=21 is set as a misfire detection threshold value comparison section.

In step S14, the misfire detection threshold value calculation part 53 calculates a threshold value comparison target cycle TRtrs (N). As the threshold value comparison target cycle TRtrs (N), the angle detection cycle TR(CN) corresponding to the threshold value comparison calculation number is substituted from the threshold value comparison calculation start point N=0. However, when CN=0, 24 after two missing teeth 124NT, the value of ⅓ of the angle detection cycle TR(0) or TR(24) detected at CN=0, 24 is substituted for TRtrs (N), TRtrs (N−1), and TRtrs (N−2), respectively.

In step S15, the misfire detection threshold value calculation part 53 calculates the misfire detection threshold value cycle Tkitrs (N) that is the product of the reference detection cycle Tki and the threshold adjustment coefficient αKI (N) provided for each threshold value comparison calculation number N. In the present embodiment, the misfire detection threshold value calculation part 53 changes the threshold value comparison calculation number N one by one within the range of 0 to 23 as shown in the following equation, the reference detection cycle Tki is multiplied by a threshold value adjustment coefficient aKI (N) provided for each threshold value comparison calculation number to calculate a misfire detection threshold value cycle Tkitrs (N) for each threshold value comparison calculation number. The misfire detection threshold value cycle Tkitrs (N) of each threshold value comparison operation number N is stored in a storage device 91 such as a RAM.

$$Tkitrs(N) = Tki \times aKI(N) \quad (3)$$

N:0 to 23

Detailed Description of the <Misfire Detection Threshold Value Comparison Part 54>

Next, in step S16, the misfire detection threshold value comparison part 54 compare the misfire detection threshold value cycle Tkitrs (N) with the threshold value comparison cycle TRtrs (N) in the misfire detection threshold value comparison section that is the crankshaft angle section from the top dead center of the compression stroke of the first cylinder to the top dead center of the exhaust stroke. When the threshold value comparison target cycle TRtrs (N) is larger than the misfire detection threshold value cycle Tkitrs (N), 1 is added to the misfire detection counter NOVER.

In the present embodiment, the misfire detection threshold value comparison section is set to a section from crank number CN=33 to 6, that is, 40 degrees to 355 degrees after the top dead center of the compression stroke of the first cylinder.

Detailed Description of the <Misfire Determination Part 55>

In step S17, the misfire determination part 55 determines whether or not the current crank number CN is a preset final calculation time Pend of the first cylinder. In this example, the final calculation time point Pend of the first cylinder is set to CN=6 (5 degrees before the top dead center of the exhaust stroke), which is the end time of the four cycles of the first cylinder. The misfire determination part 55 proceed to step S18 when it is determined that it is the final calculation time Pend of the first cylinder (step S17: Yes), and end the process when it is determined that it is not the final calculation time Pend of the first cylinder (step S17: No).

In step S18, the misfire determination part 55 determines the presence or absence of misfire in the combustion stroke after the top dead center of the first cylinder, based on the misfire detection counter NOVER calculated by the misfire detection threshold value comparison part 54.

Due to the occurrence of misfire, rotation fluctuation occurs particularly in the combustion stroke, and the angle detection cycle TR(CN) fluctuates. However, the rotational fluctuation of the internal combustion engine is also caused by factors other than misfire (for example, the acceleration and deceleration of the vehicle, the amount of intake air filled in the combustion chamber, etc.). If the vehicle is accelerating or decelerating, the angle detection cycle TR decreases or increases as a whole. Further, as the combustion torque increases as the intake air amount increases, the fluctuation amount of the angle detection cycle TR in the combustion stroke also increases. Since the two-wheeled vehicle like this embodiment has a small inertia of the vehicle and the power transmission mechanism, the amount of decrease or increase in the angle detection cycle TR due to factors other than misfire increases.

The influence of rotational fluctuation due to factors other than misfire appears in the angle detection cycle TR of the misfire detection threshold value comparison section after top dead center. When determining the presence or absence of misfire based on only the accumulated value of the deviation between the reference rotational speed in the misfire detection threshold value comparison section and the rotational speed detected at each crankshaft angle as in the prior art, there is a possibility that the presence or absence of misfire may be erroneously determined due to fluctuations in the angle detection cycle TR of the misfire detection threshold value comparison section due to factors other than misfire. However, according to the above configuration, the angle detection cycle TR(CN) in which the influence of rotational fluctuation due to factors other than misfire appears is based on the set value of the threshold value adjustment coefficient aKI (N) of the misfire detection threshold value cycle Tkitrs (N), can be excluded from misfire detection decisions, the effects of rotational fluctuations due to misfire are evaluated, misfire can be accurately determined.

In the present embodiment, the misfire determination part 55 compares the sizes of the misfire detection counter NOVER and the misfire detection determination value MFCNT, and determine if there is a misfire.

The misfire detection determination value MFCNT may be a fixed set value or a set value using a map that changes according to the engine state, such as the engine speed, the throttle opening, and the intake air pressure.

FIG. 5 shows the behavior when no misfire occurred, and FIG. 6 shows the behavior when misfire has occurred.

When no misfire occurred, the misfire detection counter NOVER is smaller than the misfire detection determination value MFCNT, and when misfire has occurred, the misfire detection counter NOVER becomes larger than the misfire detection determination value MFCNT.

The misfire determination part 55 determine that a misfire has occurred if the misfire detection counter NOVER is greater than a preset misfire detection determination value MFCNT, and determine that no misfire has occurred if the misfire detection counter NOVER is smaller than the misfire detection determination value MFCNT.

Detailed Description of the <Misfire Notification Part 56>

Next, in step S19, the misfire notification part 56 notifies the user of the misfire determination result by the misfire determination part 55 via the notification device 126. For example, the misfire notification part 56 turns on a failure warning lamp as the notification device 126 when the occurrence frequency of misfire is higher than a preset frequency determination value. Moreover, the misfire notification part 56 displays information on the determination result of misfire on a display screen as the notification device 126 provided on the meter panel. The misfire notification part 56 transmits the misfire determination result to the vehicle diagnosis device as the notification device 126 connected to the vehicle as one piece of failure information of OBD (On Board Diagnostic).

The following can be said when the background and main points of the first embodiment of the present application are roughly organized.

The influence of rotational fluctuation due to misfire and factors other than misfire appears in the detection cycle of the misfire detection threshold value comparison section after the top dead center. For example, the detection cycle of the misfire detection threshold value comparison section varies due to acceleration or deceleration of the vehicle. Further, it has been experimentally measured that there is a point where misfire is easily detected for each engine operating region, for example, a point where misfire is difficult to detect is correlated with the engine load. When the intake air amount is small and the combustion is weak, the change in the crankshaft angle is small, and the rotational fluctuation due to misfire has little change near the compression top dead center. In this case, the accuracy of misfire detection is improved by including the cycle change up to the combustion stroke and the exhaust stroke. If the intake air volume is large and combustion is strong, the cycle change of the crankshaft angle is large, and the rotational fluctuation due to misfire is also large near the compression top dead center. It is desirable to detect the misfire by extracting the point. In the case of an engine with multiple cylinders, there are points that are affected by the combustion of other cylinders, it is desirable to remove that point and detect misfire. According to the control device for an internal combustion engine according to the present application, in the misfire detection threshold value comparison section where the influence of rotation fluctuation due to misfire and the factors other than misfire appeared, it is possible to determine misfire by extracting only points that are easy to detect misfire, the misfire can be accurately determined by evaluating the influence of rotational fluctuation due to misfire in a wide range of engine operation.

More generally, the control device for an internal combustion engine determines whether or not misfire has occurred in a combustion stroke after top dead center based on the threshold value cycle and the detection cycle, even when rotational fluctuations of the internal combustion engine occur due to factors other than misfire, in order to provide a control device for an internal combustion engine that can accurately determine the presence or absence of misfire, the detection cycle detected within the reference angle interval including the top dead center of the compression stroke is calculated as the reference detection cycle, the threshold value cycle which is the product of the reference detection cycle and the coefficient set for each detection cycle is calculated.

Description of the [Other Embodiments]

Next, other embodiments of the present application will be described. Note that the configuration of each embodiment described below is not limited to being applied independently, and can be applied in combination with the configuration of other embodiments as long as no contradiction arises.

(1) In the first embodiment, the internal combustion engine 100 is described as an example of a two-cylinder engine. However, the embodiment of the present application is not limited to this. In other words, the internal combustion engine 100 may be an engine having an arbitrary number of cylinders such as one cylinder and three cylinders, and the control device 121 may be configured to determine misfire of each cylinder.

(2) In the first embodiment described above, the internal combustion engine 100 and the control device 121 have been described as an example in which they are mounted on a two-wheeled vehicle. However, the embodiment of the present application is not limited to this. In other words, the internal combustion engine 100 and the control device 121 according to the embodiment of the present application may be mounted on a four-wheeled vehicle or other various vehicles.

(3) In the first embodiment, the reference cycle calculation part 52 is described as an example in which the average value of a plurality of angle detection cycle TR detected within the reference angle section is calculated as the reference detection cycle Tki. However, the embodiment of the present application is not limited to this. In other words, the reference cycle calculation part 52 is configured to calculate one angle detection cycle TR detected within the reference angle section (for example, the angle detection cycle TR (31) detected at the crank number CN=31) as the reference detection cycle Tki.

(4) In the first embodiment, the control device 121 has described the case where the reference detection cycle Tki and the misfire detection threshold value cycle Tkitrs are calculated using the angle detection cycle TR as it is. However, the embodiment of the present application is not limited to this. In other words, the control device 121 is configured to calculate the reference detection cycle Tki and the misfire detection threshold value cycle Tkitrs using a value obtained by converting the angle detection cycle TR to the rotation speed (for example, the inverse of the angle detection cycle TR).

(5) In the first embodiment, in the example described above, the signal plate 124 that rotates integrally with the crankshaft 115 is provided as the "rotating member", the tooth 124NT (the missing tooth 124NT of the signal plate 124 are used as the "detected part", and the crank angle sensor 118 is provided as the "angle sensor". However, the embodiment of the present application is not limited to this.

By the way, the internal combustion engine 100 includes a camshaft connected to the crankshaft 115 by a chain. The camshaft opens and closes the intake valve 111 and the exhaust valve 116. While the crankshaft 115 rotates twice, the camshaft rotates once. The internal combustion engine 100 may include a cam signal plate that rotates integrally with the cam shaft. The cam signal plate is provided with a plurality of teeth 124N at a plurality of predetermined cam shaft angles. The camshaft angle has a predetermined correspondence with the crankshaft angle.

The internal combustion engine 100 may include a cam angle sensor that is fixed to the cylinder block 122 and detects the tooth 124N of the cam signal plate.

The angle information detection part 51 uses the correspondence between the camshaft angle and the crankshaft angle based on the output signal of the cam angle sensor, and is configured to detect the crankshaft angle and the crankshaft angle detection cycle TR is detected every time the crankshaft angle is detected.

In this way, the cam signal plate that rotates integrally with the cam shaft is provided as the "rotating member", the tooth of the signal plate for the cam are provided as the "detected part", the cam angle sensor is provided as the "angle sensor".

(6) In the first embodiment described above, the misfire determination part may calculate the difference between the misfire counter and the misfire determination value, and determine the presence or absence of misfire based on the difference.

(7) In the first embodiment described above, the misfire determination part may calculate the ratio between the misfire counter and the misfire determination value, and determine the presence or absence of misfire based on the ratio.

Although the present application describes exemplary embodiments, the various features, aspects, and functions described in the embodiments are not limited to application of specific embodiments, the present invention can be applied to the embodiments alone or in various combinations. Accordingly, countless variations that are not illustrated are envisaged within the scope of the technology disclosed herein. For example, the case where at least one component is modified, the case where it is added, or the case where it is omitted are included.

REFERENCE SIGNS LIST

51, Angle information detection part,
52, Reference cycle calculation part,
53, Misfire detection threshold value calculation part,
54, Misfire detection threshold value comparison part,
55, Misfire determination part,
56, Misfire notification part,
90 Arithmetic processing device,
91 Storage device,
92 Input circuit,
93 Output circuit,
100 Internal combustion engine,
101 Intake passage,
101a Intake pipe,
102 Air filter,
103 Throttle valve,
104 Intake pressure sensor,
105 Combustion chamber,
106 Bypass flow path,
107 Idle speed control valve,
108 Fuel pump,
109 Fuel tank,
110 Injector,
111 Intake valve,
112 Spark plug,
113 Piston,
114 Connecting rod,
115 Crankshaft,
116 Exhaust valve,
117 Exhaust passage,
118 Crank angle sensor (angle sensor),
119 Three-way catalyst,
120 O2 sensor,
121 Control device,
122 Cylinder block,
123 Cylinder head,
124 Signal plate,
124T Tooth,
124NT Missing tooth,
125 Outside air temperature sensor,
126 Notification device,
CN Crank number,
MFCNT Misfire detection judgment value,
N Threshold value comparison operation number,
NOVER Misfire detection counter,
Pend Final calculation time,
Ptki Reference cycle calculation time,
Tki Reference detection cycle,
Tkitrs Misfire detection threshold value cycle,
TR Angle detection cycle,
TRtrs Threshold value comparison target cycle

The invention claimed is:

1. A control device for an internal combustion engine, wherein presence or absence of misfire based on an angle detection time period calculated from an output signal of an angle sensor is determined, and wherein,
the control device includes an arithmetic processing device, a storage device, and an input circuit,
in the control device, the arithmetic processing device calculates the angle detection time period from the output signal of the angle sensor input from the input circuit, the storage device is configured to store the angle detection time period calculated within a reference angle interval including a top dead center of a compression stroke of the internal combustion engine as a reference detection time period,
the control device is configured so that the storage device stores the angle detection time period calculated in a misfire detection threshold value comparison section after a reference angle section as a threshold value comparison target time period,
the control device is configured such that the arithmetic processing device calculates a misfire detection threshold value time period by multiplying the reference detection time period and a threshold value adjustment coefficient, and determines the presence or the absence of misfire based on comparison between the misfire detection threshold value time period and the threshold value comparison target time period.

2. The control device for the internal combustion engine according to claim 1, wherein
the control device is configured such that the arithmetic processing device calculates an average value of a plurality of the angle detection time periods calculated within the reference angle interval as the reference detection time period.

3. The control device for the internal combustion engine according to claim 2, wherein
the misfire detection threshold value comparison section is set to include at least a section within the range of the combustion stroke after the top dead center.

4. The control device for the internal combustion engine according to claim 1, wherein the misfire detection threshold value comparison section is set to include at least a section within the range of the combustion stroke after the top dead center.

5. A control device for an internal combustion engine comprising:
   a plurality of detected targets provided corresponding to a plurality of predetermined crankshaft angles on a rotating member that rotates in synchronization with the crankshaft,
   an angle sensor that is fixed to a non-rotating member and detects the detected targets,
     an angle information detector that detects a crankshaft angle based on an output signal of the angle sensor and detects a detection time period of the crankshaft angle every time the crankshaft angle is detected,
     a reference time period calculator that calculates the detection time period detected within a reference angle section that is a preset crankshaft angle section including a top dead center of a compression stroke, as a reference detection time period, based on the detected value of the crankshaft angle and the detection time period,
     a misfire detection threshold value calculator for calculating a misfire detection threshold value time period obtained by multiplying the reference detection time period and a threshold value adjustment coefficient,
     a misfire detection threshold value comparator for calculating a misfire detection counter, based on a threshold value comparison time period calculated based on the misfire detection threshold value time period and the reference detection time period, in a misfire detection threshold value comparison section after the reference angle section, and
     a misfire determiner that determines the presence or absence of misfire in a combustion stroke after the top dead center based on comparison between the misfire detection counter and a misfire detection determination value.

6. The control device for the internal combustion engine according to claim 5, wherein
   the reference time period calculator calculates an average value of the plurality of detection time periods detected within the range of the reference angle section as the reference detection time period.

7. The control device for the internal combustion engine according to claim 6, wherein
   the misfire detection threshold value comparison section is set to include at least a section within the range of the combustion stroke after the top dead center.

8. The control device for the internal combustion engine according to claim 5, wherein
   the misfire detection threshold value comparison section is set to include at least a section within the range of the combustion stroke after the top dead center.

* * * * *